(12) United States Patent
Geoffroy et al.

(10) Patent No.: US 9,225,000 B2
(45) Date of Patent: Dec. 29, 2015

(54) CURRENT COLLECTING TERMINAL WITH PTC LAYER FOR ELECTROCHEMICAL CELLS

(75) Inventors: Sebastien Geoffroy, Montreal (CA); Bruno Bacon, Montreal (CA); Yvan Roy, Saint-Hubert (CA); Claude Carignan, Varennes (CA); Alain Vallee, Varennes (CA)

(73) Assignee: Bathium Canada Inc., Boucherville (CA)

(*) Notice: Subject to any disclaimer, the term of this patent is extended or adjusted under 35 U.S.C. 154(b) by 1014 days.

(21) Appl. No.: 13/188,935

(22) Filed: Jul. 22, 2011

(65) Prior Publication Data

US 2012/0189881 A1  Jul. 26, 2012

Related U.S. Application Data

(60) Provisional application No. 61/366,628, filed on Jul. 22, 2010.

(51) Int. Cl.
| | | |
|---|---|---|
| *H01M 2/26* | (2006.01) | |
| *H01M 2/22* | (2006.01) | |
| *H01M 2/30* | (2006.01) | |
| *H01M 10/637* | (2014.01) | |
| *H01M 10/613* | (2014.01) | |
| *H01M 10/625* | (2014.01) | |

(52) U.S. Cl.
CPC ............. *H01M 2/266* (2013.01); *H01M 2/22* (2013.01); *H01M 2/30* (2013.01); *H01M 10/613* (2015.04); *H01M 10/637* (2015.04); *H01M 10/625* (2015.04); *H01M 2200/106* (2013.01)

(58) Field of Classification Search
CPC .......... H01M 10/502; H01M 10/5026; H01M 10/5016; H01M 10/045; H01M 2200/10; H01M 2200/106

See application file for complete search history.

(56) References Cited

U.S. PATENT DOCUMENTS

| | | | |
|---|---|---|---|
| 6,099,986 A * | 8/2000 | Gauthier et al. | 429/120 |
| 6,235,426 B1 | 5/2001 | Yanai et al. | |
| 6,346,345 B2 | 2/2002 | Shiota et al. | |
| 7,417,527 B2 | 8/2008 | Yamashita | |
| 7,532,101 B2 | 5/2009 | Suzuki | |
| 7,534,526 B2 | 5/2009 | Shoji et al. | |
| 7,541,112 B2 | 6/2009 | Richard et al. | |
| 7,544,311 B2 | 6/2009 | Chen et al. | |
| 2004/0257036 A1 | 12/2004 | Kim | |
| 2005/0221173 A1* | 10/2005 | Tatebayashi et al. | 429/161 |
| 2005/0266279 A1* | 12/2005 | Kim | 429/7 |
| 2005/0266302 A1 | 12/2005 | Kim | |
| 2006/0068275 A1* | 3/2006 | Chung et al. | 429/121 |
| 2008/0241684 A1 | 10/2008 | Muraoka et al. | |
| 2010/0233536 A1 | 9/2010 | Yang et al. | |

FOREIGN PATENT DOCUMENTS

| | | |
|---|---|---|
| EP | 1753053 | 2/2007 |
| EP | 2164121 | 3/2010 |

* cited by examiner

*Primary Examiner* — Raymond Alejandro
(74) *Attorney, Agent, or Firm* — McMillan LLP

(57) ABSTRACT

An electrochemical cell battery having current collecting terminals acting as security device. The current collecting terminals utilize layers of PTC materials strategically positioned whereby if a temperature of an electrochemical cell rises above the transition temperature of the layer of PTC material, electrical current is prevented to flow between electrochemical cells by the layer of PTC material.

4 Claims, 4 Drawing Sheets

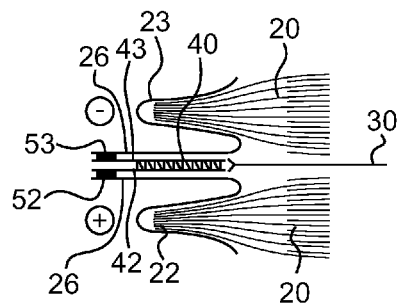
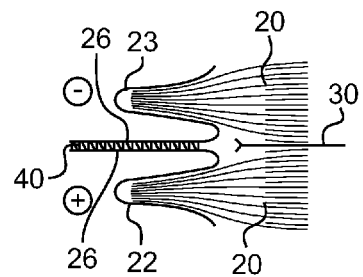
FIG. 3        FIG. 4
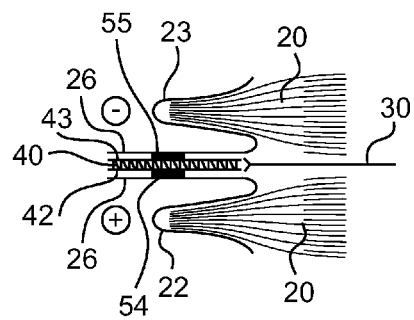
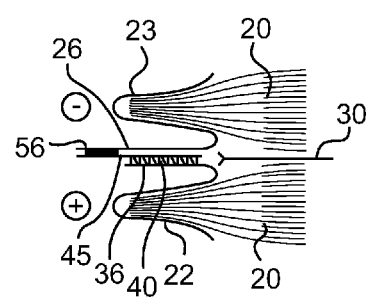
FIG. 5        FIG. 6
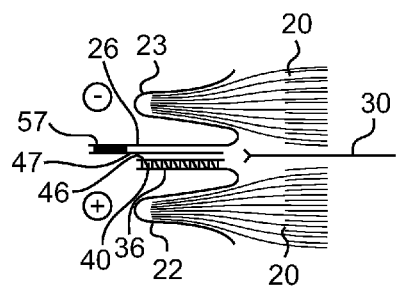
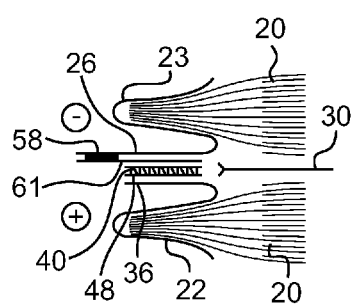
FIG. 7        FIG. 8

CURRENT COLLECTING TERMINAL WITH PTC LAYER FOR ELECTROCHEMICAL CELLS

CROSS-REFERENCE

The present application claims priority to U.S. Provisional Patent Application No. 61/366,628 filed on Jul. 22, 2010, the entirety of which is incorporated herein by reference.

FIELD OF THE INVENTION

The present invention relates to electrochemical cells batteries and, more specifically, to electrochemical cell batteries having current collecting terminals acting as security device.

BACKGROUND OF THE INVENTION

The automotive industry has been seeking to commercialize a viable and safe electrical vehicle for several decades now. An important element of such a vehicle is its battery. The battery or batteries must not only provide the requisite level of energy and reasonable autonomy as well as be durable, but must also include or be equipped with security devices to prevent overcharge, over-discharge, internal and external short circuits and over-heating.

Security devices for batteries are typically in the form of electronic monitoring systems that monitor the voltage, the current and the temperature of the batteries and shut down the battery when a problem is detected. These electronic systems perform well under normal circumstances but may be unable to prevent damages to the battery in circumstances where an internal short-circuit occurs within the series of electrochemical cells making up of the battery. Internal short-circuits, although rare, can cause the temperature of the battery to rise to dangerous levels causing permanent damages to the battery and may also cause damages to the various components in the vicinity of the battery experiencing an internal short-circuit.

U.S. Pat. No. 6,099,986 provides one solution to the potential problems of such internal short-circuits by including fuses between each connection of the electrochemical cells and the battery poles. This system of fuses cuts off the excessive electric current generated by a specific electrochemical cell experiencing an internal short-circuit from the other cells thereby limiting the damage caused by the internal short-circuit to the specific electrochemical cell. The system is however complex and cumbersome requiring multiple solder to connect each fuse to each electrochemical cell and requires added space to accommodate the plurality of fuses.

Therefore, there is a need for a security device which is less complex and cumbersome than the prior art and adapted to prevent damages in a battery experiencing an internal short-circuit.

SUMMARY OF THE INVENTION

It is an object of the present invention to ameliorate at least some of the inconveniences present in the prior art.

In one aspect, the invention provides a battery comprising a plurality of electrochemical cells connected in series or parallel; each electrochemical cell comprises a series of primary laminates each including a negative electrode, a positive electrode, an electrolyte interposed between the negative and positive electrodes, a positive current collector extending from one side of the primary laminates and a negative current collector extending from an opposite side of the primary laminates; each electrochemical cell having a current collecting terminal connecting the positive current collectors together and a current collecting terminal connecting the negative current collectors together; the current collecting terminals each having a folded extension arm for electrically connecting two adjacent electrochemical cells together, at least one of the current collecting terminal having a layer of PTC material for opening and closing the electrical connection between two adjacent electrochemical cells.

Embodiments of the present invention each have at least one of the above-mentioned aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 3 is a schematic front elevational view of a portion of two electrochemical cells shown in FIG. 1 connected together via current collecting terminals in accordance with one embodiment of the invention;

FIG. 4 is a schematic front elevational view of a portion of two electrochemical cells shown in FIG. 1 connected together via current collecting terminals in accordance with another embodiment of the invention;

FIG. 5 is a schematic front elevational view of a portion of two electrochemical cells shown in FIG. 1 connected together via current collecting terminals in accordance with another embodiment of the invention;

FIG. 6 is a schematic front elevational view of a portion of two electrochemical cells shown in FIG. 1 connected together via current collecting terminals in accordance with another embodiment of the invention;

FIG. 7 is a schematic front elevational view of a portion of two electrochemical cells shown in FIG. 1 connected together via current collecting terminals in accordance with another embodiment of the invention;

FIG. 8 is a schematic front elevational view of a portion of two electrochemical cells shown in FIG. 1 connected together via current collecting terminals in accordance with another embodiment of the invention;

DETAILED DESCRIPTION OF THE PREFERRED EMBODIMENTS

Figure 1:
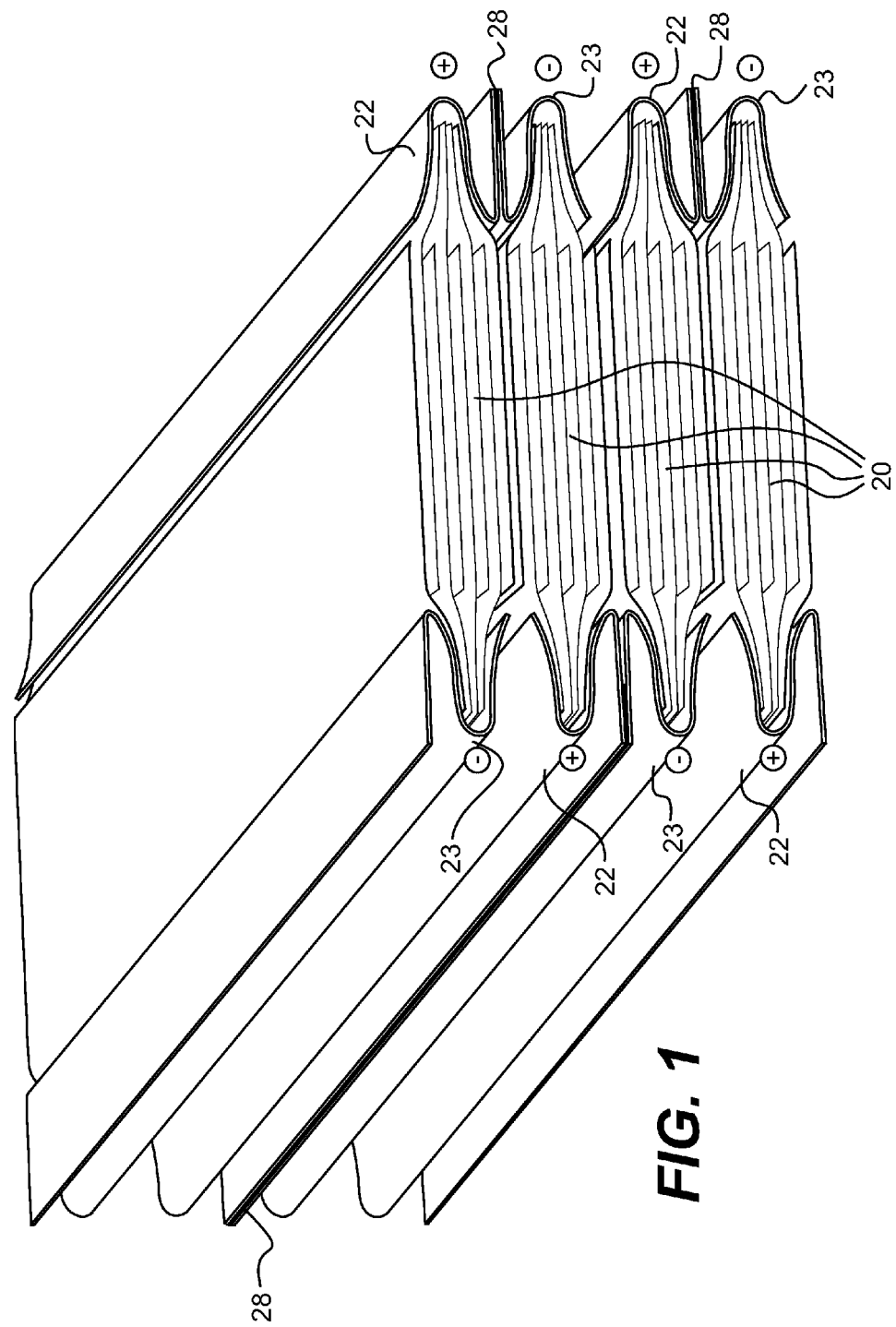
FIG. 1 is a schematic perspective view of a portion of a stack of electrochemical cells forming a battery connected in series with current collecting terminals.

With reference to FIG. 1, there is shown an example of a stack of electrochemical cells 20 forming a battery. Each electrochemical cell 20 comprises a series of primary laminates each including a negative sheet-like electrode, a positive sheet-like electrode, and a film of electrolyte interposed between the negative and positive electrodes. In addition, a sheet-like current collector supports the positive electrode which is typically a paste-like material in the form of a sheet. In the present example, the negative electrode is a lithium or lithium alloy metal sheet or foil, which acts both as a cation source and as a current collector. However, the negative electrode may also comprise a current collector sheet distinct from the active negative electrode material. For instance, the negative electrode may be a composite comprising a current collector sheet preferably made of copper, a polymer, electronic conductive filler, and an intercalation material.

Anode intercalation material known to those skilled in the art may be used for the negative electrode and, in particular, may be selected from the group consisting of: carbon, activated carbon, graphite, petroleum coke, a lithium alloy, nickel powder, lithium titanate, etc.

With respect to the positive electrode sheet, the latter typically comprises a compound of a polymer, a lithium salt, and electrochemically active material. Examples of suitable electrochemically active material include: $Li_xV_yO_z$; $LiCOO_2$; $Li_xMn_yO_z$; $LiNiO_2$; $LiFePO_4$; VA; $Mn_yO_z$; $Fe(PO_4)_3$; and $Li_xTi_yO_z$. In a preferred embodiment, cathode 24 preferably comprises $LiFePO_4$.

With respect to the electrolyte film, the electrolyte film is preferably solid and made of polymer mixed with a lithium salt, physically separating the negative and positive electrodes and acting as an ion transporting membrane.

The current collector sheet, which serves the primary function of conducting the flow of electrons between the active material of electrode and the terminals of a battery (not shown), is typically constructed of a sheet of copper, nickel, or aluminum. In a preferred embodiment, the current collector of the positive electrode comprises an aluminum sheet or foil coated with a thin protective layer. The protective layer prevents degradation of the current collector sheet when it is in contact with the positive electrode material.

Each laminate of an electrochemical cell 20 is designed such that the current collector sheet of the positive electrode extend on one side of the electrochemical cell 20 while the lithium metal foil which acting as the current collector of the negative electrode extend on the opposite side of the electrochemical cell 20. As shown in FIG. 1, the extensions of the current collectors of all the positive electrodes of an electrochemical cell 20 are assembled and crimped together via a current collecting terminal 22 similar to those described in U.S. Pat. No. 7,541,112 which is herein incorporated by reference, in order to electrically connect all the current collectors of all the positive electrodes of an electrochemical cell 20 together. The extensions of the lithium metal foil of all the negative electrodes of an electrochemical cell 20 are similarly assembled and crimped together via a current collecting terminal 23 in order to electrically connect all extensions of the lithium metal foil of all the negative electrodes of an electrochemical cell 20 together.

As shown in FIG. 1, the current collecting terminals 22 and 23 extend the entire length of the electrochemical cells 20 and electrically connect a large surface area of the current collectors of the positive electrode and the extensions of the lithium foils of the negative electrodes respectively such that the electrical connections of the current collecting terminals 22 and 23 can accommodate high currents.

Figure 2:
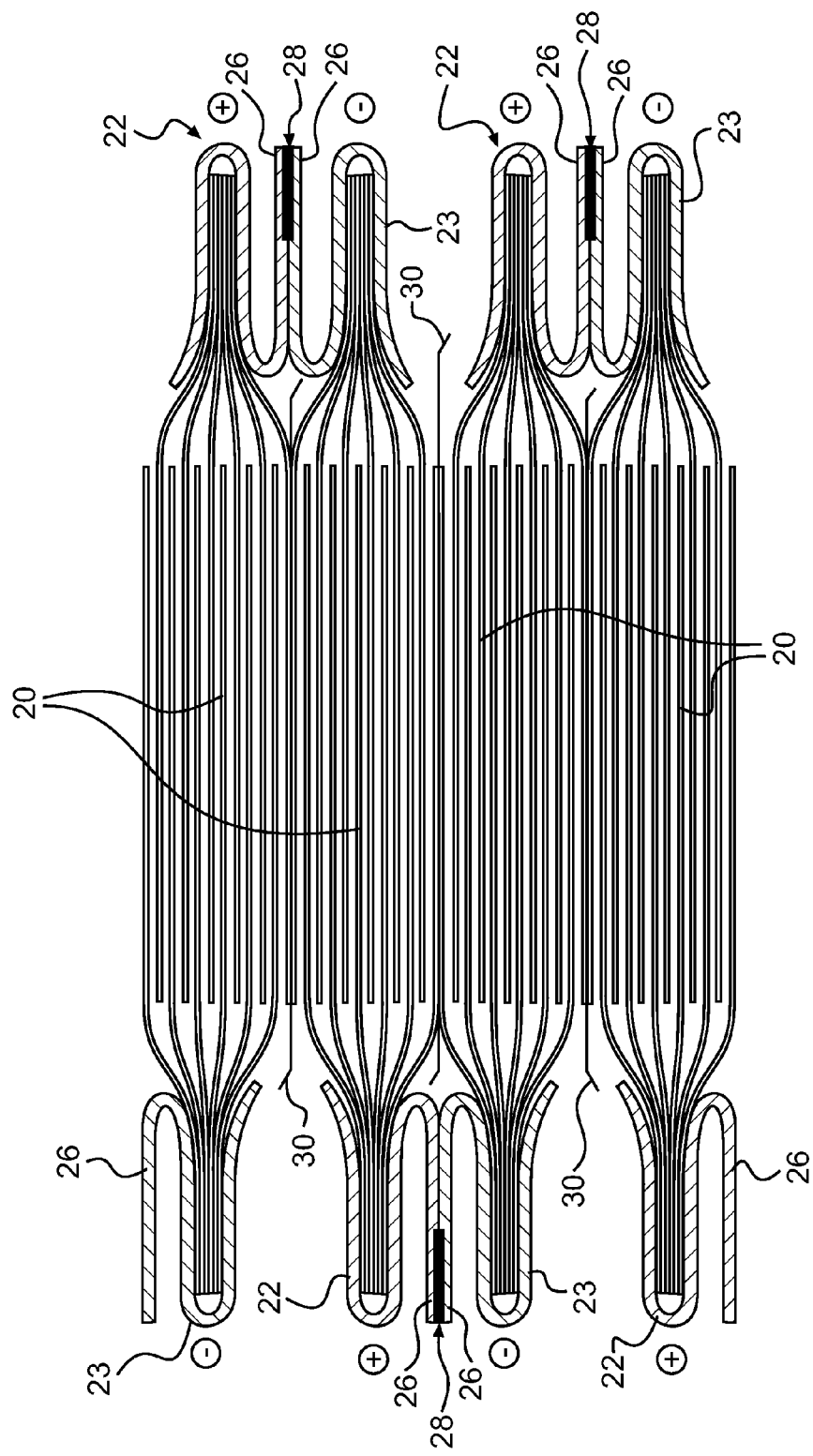
FIG. 2 is a schematic front elevational view of the portion of a stack of electrochemical cells shown in FIG. 1.

With reference to FIG. 2 illustrating the front portion of the stack of electrochemical cells 20 shown in FIG. 1 in elevation, the electrochemical cells 20 are electrically connected together in series via the current collecting terminals 22 and 23 wherein the negative current collecting terminals 23 are connected to the positive current collecting terminals 22 thereby increasing the voltage of the stack of electrochemical cells 20 with each added electrochemical cell 20 connected in series.

The current collecting terminals 22 and 23 feature folded extension arms 26 which are typically welded together as illustrated by the dark traces 28 when the stack of electrochemical cells 20 is assembled and electrically connected together. As illustrated in FIG. 1, the folded extension arms are welded together along their entire length. The folded extension arms 26 are bent such that when electrically connecting the stack of electrochemical cells 20 in series or parallel, the folded arms 26 of two adjacent current collecting terminals 22 and 23 are positioned side by side and are welded or soldered together to ensure good electrical contacts. The folded extension arms 26 of the two adjacent current collecting terminals 22 and 23 are welded throughout their entire lengths thereby providing a large surface area of contact between the adjacent current collecting terminals 22 and 23 in order to accommodate high current loads.

As shown in FIG. 2, the individual electrochemical cells 20 of the stack are separated by an insulating film of plastic material 30 such as polypropylene, to prevent direct contact and potential short circuit between the individual electrochemical cells 20.

In the event of an internal short circuit between two or more electrochemical cells 20 in the battery having multiple electrochemical cells 20, the temperature of the battery and specifically the temperature of the electrochemical cells 20 experiencing the internal short circuit will rise rapidly to unsafe levels. A rapid rise in the temperature of the electrochemical cells may also occur if one or more of the electrochemical cells of the battery is in an overcharged or over discharged state. To prevent rapid rise in temperature and potential thermal runaway that may destroy the battery, a (Positive Temperature Coefficient) PTC material is used at the connection level between current collecting terminals 22 and 23. PTC materials such as polymer composites (Polymer and carbon) and Barium Titanate based compounds have the ability to dramatically increase their electrical resistance when they reach a specific predetermined temperature such that they conduct electric current below the specific temperature and are highly resistant to the passage of electrons above the specific temperature. PTC materials positioned strategically at the connection level of the electrochemical cells 20 will cut or open a short-circuit occurring between two or more electrochemical cells 20 once the temperature of the cell or cells 20 reach the specific temperature thereby preventing thermal runaway. PTC materials have the advantage that the change in electrical resistance is completely reversible such that when the temperature of the electrochemical cells falls back below the transition temperature of the PTC material, the PTC material returns to its electrically conductive state thereby closing the electrical circuit.

For electrochemical cells having lithium or lithium alloy foils as the negative electrodes, a preferred PTC material is a polymer composites consisting of HDPE and carbon. The transition temperature of this PTC material is around 125° C. which is well below the temperature of fusion of lithium which is around 180° C. thereby avoiding potential problems of melting of the lithium or lithium alloy foils is the temperature of the electrochemical cells is allowed to reach temperature approaching the temperature of fusion of lithium.

FIG. 3 illustrates a first example of implementation of a PTC material positioned at the connection level between two electrochemical cells 20. A layer of PTC material 40 sandwiched between two foils of conductive metal 42 and 43 is positioned between the folded extension arms 26 of adjacent current collecting terminals 22 and 23. As illustrated, the conductive metal foils 42 and 43 extend beyond the layer of PTC material sandwiched therebetween such that the metal foil 42 can be separately connected to the folded extension arm 26 of current collecting terminal 22 at the connection area 52 and the metal foil 43 can be separately connected to the folded extension arm 26 of current collecting terminal 23 at the connection area 53. The connections of the metal foils 42 and 43 with their respective folded arms 26 may be made by welding, mechanical crimp or through the use of conductive glue. With this particular assembly, the layer of PTC material 40 is an integral part of the electrical connection between current collecting terminals 22 and 23. If a short-circuit, or an overcharge condition, or an over discharge condition occurs, causing a rapid rise in the temperature of the electrochemical cell or cells 20, the layer of PTC material 40 will eventually reach its transition temperature where its electrical resistance increases rapidly to become effectively non-conductive thereby opening the electrical circuit and preventing further rise in the temperature and the potential damages associated with high temperature. If the situation which caused the rise in temperature disappears, the temperature of the electrochemical cell or cells 20 will decrease and the layer of PTC material 40 will return to its electrically conductive state when the temperature falls below the transition temperature of the PTC material thereby closing the electrical circuit.

FIG. 4 illustrates a second example of implementation of a PTC material positioned at the connection level between two electrochemical cells 20. In this example, a layer of PTC material 40 is directly spread onto the surfaces of both folded extension arms 26 of the adjacent current collecting terminals 22 and 23 and are connected using a conductive glue. The layer of PTC material 40 is an integral part of the electrical connection between current collecting terminals 22 and 23 and if a short-circuit, or an overcharge condition, or an over discharge condition occurs, causing a rapid rise in the temperature of the electrochemical cell or cells 20, the layer of PTC material 40 will eventually reach its transition temperature where the resistance of the layer of PTC material increases sharply to become effectively non-conductive thereby opening the electrical circuit and preventing further rise in the temperature and the potential damages associated with high temperature. If the situation which caused the rise in temperature is reversed, the temperature of the electrochemical cell or cells 20 will decrease and the layer of PTC material 40 will return to its electrically conductive state when the temperature falls below the transition temperature of the PTC material thereby closing the electrical circuit.

FIG. 5 illustrates another example of implementation of a PTC material positioned at the connection level between two electrochemical cells 20. In this example, a layer of PTC material 40 sandwiched between two foils of conductive metal 42 and 43 is positioned between the folded extension arms 26 of adjacent current collecting terminals 22 and 23. The metal foil 42 is connected to the folded extension arm 26 of current collecting terminal 22 at the connection area 54 via either a conductive glue or a weld preferably using a welding compound consisting of Sn60% and Pb40% and the metal foil 43 is separately connected to the folded extension arm 26 of current collecting terminal 23 at the connection area 55 via either a conductive glue or a weld preferably using a welding compound consisting of Sn60% and Pb40%. The layer of PTC material 40 is an integral part of the electrical connection between current collecting terminals 22 and 23 and if a short-circuit, or an overcharge condition, or an over discharge condition occurs, causing a rapid rise in the temperature of the electrochemical cell or cells 20, the layer of PTC material 40 will eventually reach its transition temperature where the resistance of the layer of PTC material increases sharply to become effectively non-conductive thereby opening the electrical circuit and preventing further rise in the temperature and the potential damages associated with high temperature. If the situation which caused the rise in temperature is reversed, the temperature of the electrochemical cell or cells 20 will decrease and the layer of PTC material 40 will return to its electrically conductive state when the temperature falls below the transition temperature of the PTC material thereby closing the electrical circuit.

FIG. 6 illustrates another example of implementation of a PTC material positioned at the connection level between two electrochemical cells 20. In this example, the current collecting terminal 22 is modified and features a shortened folded extension arm 36. A layer of PTC material 40 is spread over the surface of the shortened folded extension arm 36 and a conductive metal foil 45 is positioned over the layer of PTC material 40 that extends beyond the layer of PTC material 40. The layer of PTC material 40 is therefore sandwiched between the conductive metal foil 45 and the shortened folded extension arm 36. The conductive metal foil 45 is adjacent to the folded extension arm 26 of current collecting terminal 23 and the extension of the conductive metal foil 45 is welded to the folded extension arm 26 of current collecting terminal 23 at the connection area 56 to electrically connect the two electrochemical cells 20. The layer of PTC material 40 is an integral part of the electrical connection between current collecting terminals 22 and 23 and if a short-circuit, or an overcharge condition, or an over discharge condition occurs, causing a rapid rise in the temperature of the electrochemical cell or cells 20, the layer of PTC material 40 will eventually reach its transition temperature where the resistance of the layer of PTC material increases sharply to become effectively non-conductive thereby opening the electrical circuit and preventing further rise in the temperature and the potential damages associated with high temperature. If the situation which caused the rise in temperature is reversed, the temperature of the electrochemical cell or cells 20 will decrease and the layer of PTC material 40 will return to its electrically conductive state when the temperature falls below the transition temperature of the PTC material thereby closing the electrical circuit.

FIG. 7 illustrates a variation of the example of implementation of FIG. 6 wherein the current collecting terminal 22 features a shortened folded extension arm 36 having a layer of PTC material 40 spread over its surface and sandwiched by a first metal foil 46. A second metal foil 47 extending outwardly from the electrochemical cell 20 is connected to the first metal foil 46 via either a conductive glue or a weld preferably using a welding compound consisting of Sn60% and Pb40% and is positioned adjacent to the folded extension arm 26 of current collecting terminal 23 and the extension of the second metal foil 47 is welded to the folded extension arm 26 of current collecting terminal 23 at the connection area 57 to electrically connect the two electrochemical cells 20. The layer of PTC material 40 is an integral part of the electrical connection between current collecting terminals 22 and 23 and if a short-circuit, or an overcharge condition, or an over discharge condition occurs, causing a rapid rise in the temperature of the electrochemical cell or cells 20, the layer of PTC material 40 will eventually reach its transition temperature where the resistance of the layer of PTC material increases sharply to become effectively non-conductive thereby opening the electrical circuit and preventing further rise in the temperature and the potential damages associated with high temperature. If the situation which caused the rise in temperature is reversed, the temperature of the electrochemical cell or cells 20 will decrease and the layer of PTC material 40 will return to its electrically conductive state when the temperature falls below the transition temperature of the PTC material thereby closing the electrical circuit.

FIG. 8 illustrates another variation of the example of implementation of FIG. 6 wherein the current collecting terminal 22 features a shortened folded extension arm 36 and an assembly of a layer of PTC material 40 sandwiched between two foils of conductive metal 48 and 49 is connected to the shortened folded extension arm 36 via either a conductive glue or a weld preferably using a welding compound consisting of Sn60% and Pb40%. An additional metal foil 61 extending outwardly from the electrochemical cell 20 is connected to the conductive metal foil 49 via either a conductive glue or a weld preferably using a welding compound consisting of Sn60% and Pb40% and is positioned adjacent to the folded extension arm 26 of current collecting terminal 23. The extension of the additional metal foil 61 is welded to the folded extension arm 26 of current collecting terminal 23 at the connection area 58 to electrically connect the two electrochemical cells 20. The layer of PTC material 40 is an integral part of the electrical connection between current collecting terminals 22 and 23 and if a short-circuit, or an overcharge condition, or an over discharge condition occurs, causing a rapid rise in the temperature of the electrochemical cell or cells 20, the layer of PTC material 40 will eventually reach its transition temperature where the resistance of the layer of PTC material increases sharply to become effectively non-conductive thereby opening the electrical circuit and preventing further rise in the temperature and the potential damages associated with high temperature. If the situation which caused the rise in temperature is reversed, the temperature of the electrochemical cell or cells 20 will decrease and the layer of PTC material 40 will return to its electrically conductive state when the temperature falls below the transition temperature of the PTC material thereby closing the electrical circuit.

Figure 9:
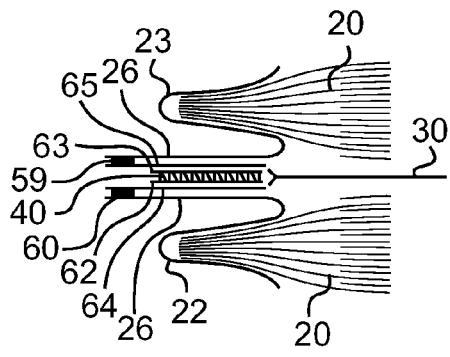
FIG. 9 is a schematic front elevational view of a portion of two electrochemical cells shown in FIG. 1 connected together via current collecting terminals in accordance with another embodiment of the invention.

FIG. 9 illustrates a variation of the example of implementation of FIG. 3 wherein an assembly of a layer of PTC material 40 sandwiched between two foils of conductive metal 62 and 63 is initially connected to a pair of additional metal foils 64 and 65 extending outwardly from the electrochemical cell 20 via either a conductive glue or a weld preferably using a welding compound consisting of Sn60% and Pb40%. The extensions of the additional metal foils 64 and 65 is welded to the folded extension arms 26 of current collecting terminals 22 and 23 at the connection areas 59 and 60 to electrically connect the two electrochemical cells 20. The layer of PTC material 40 is an integral part of the electrical connection between current collecting terminals 22 and 23 and if a short-circuit, or an overcharge condition, or an over discharge condition occurs, causing a rapid rise in the temperature of the electrochemical cell or cells 20, the layer of PTC material 40 will eventually reach its transition temperature where the resistance of the layer of PTC material increases sharply to become effectively non-conductive thereby opening the electrical circuit and preventing further rise in the temperature and the potential damages associated with high temperature. If the situation which caused the rise in temperature is reversed, the temperature of the electrochemical cell or cells 20 will decrease and the layer of PTC material 40 will return to its electrically conductive state when the temperature falls below the transition temperature of the PTC material thereby closing the electrical circuit.

Figure 10:
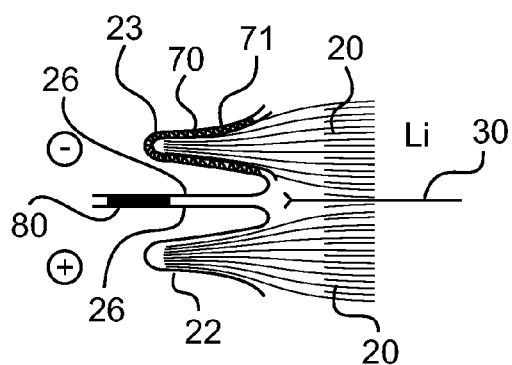
FIG. 10 is a schematic front elevational view of a portion of two electrochemical cells shown in FIG. 1 connected together via current collecting terminals in accordance with another embodiment of the invention.

FIG. 10 illustrates another example of implementation of a PTC material positioned at the connection level between two electrochemical cells 20. In this example, a layer of PTC material 70 is positioned inside the crimping portion of the current collecting terminal 23. The layer of PTC material 70 is sandwiched between the inner surface of the current collecting terminal 23 and a conductive metal foil 72. As previously described with reference to FIGS. 1 and 2, the extensions of the lithium metal foils of all the negative electrodes of the electrochemical cell 20 are assembled and crimped together via the current collecting terminal 23 in order to electrically connect all extensions of the lithium metal foil of all the negative electrodes of an electrochemical cell 20 together. In this particular example, the extensions of the lithium metal foils of all the negative electrodes are similarly assembled and crimped together via the current collecting terminal 23 but the layer of PTC material 70 and the conductive metal foil 72 are interposed between the extensions of the lithium metal foils of the negative electrodes and the current collecting terminal 23 such that the layer of PTC material 70 is an integral part of the electrical connection between current collecting terminals 22 and 23 and electrical current is prevented from flowing if the layer of PTC material 70 reaches its transition temperature. As illustrated, current collecting terminals 22 and 23 are connected together via their respective folded extension arms 26 by welding at the connection area 80. If a short-circuit, or an overcharge condition, or an over discharge condition occurs, causing a rapid rise in the temperature of the electrochemical cell or cells 20, the layer of PTC material 70 will eventually reach its transition temperature where the resistance of the layer of PTC material increases sharply to become effectively non-conductive thereby opening the electrical circuit and preventing further rise in the temperature and the potential damages associated with high temperature. If the situation which caused the rise in temperature is reversed, the temperature of the electrochemical cell or cells 20 will decrease and the layer of PTC material 70 will return to its electrically conductive state when the temperature falls below the transition temperature of the PTC material thereby closing the electrical circuit.

Figure 11:
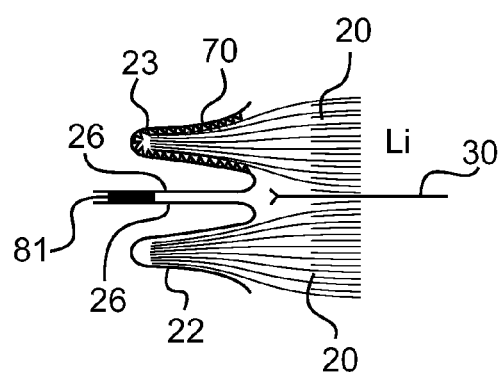
FIG. 11 is a schematic front elevational view of a portion of two electrochemical cells shown in FIG. 1 connected together via current collecting terminals in accordance with another embodiment of the invention.

FIG. 11 illustrates a variation of the example of implementation of FIG. 10 wherein a layer of PTC material 70 is positioned inside the crimping portion of the current collecting terminal 23 but there is no added metal foil 72 to sandwich the layer of PTC material 70. In this particular example, the extensions of the lithium metal foils of all the negative electrodes are assembled and crimped together via the current collecting terminal 23 with the layer of PTC material 70 directly in contact with the extensions of the lithium metal foils of the negative electrodes. The layer of PTC material 70 is still interposed between the extensions of the lithium metal foils of the negative electrodes and the current collecting terminal 23 such that the layer of PTC material 70 is an integral part of the electrical connection between current collecting terminals 22 and 23 and electrical current is prevented from flowing if the layer of PTC material 70 reaches its transition temperature. As illustrated, current collecting terminals 22 and 23 are connected together via their respective folded extension arms 26 by welding at the connection area 81. If a short-circuit, or an overcharge condition, or an over discharge condition occurs, causing a rapid rise in the temperature of the electrochemical cell or cells 20, the layer of PTC material 70 will eventually reach its transition temperature where the resistance of the layer of PTC material increases sharply to become effectively non-conductive thereby opening the electrical circuit and preventing further rise in the temperature and the potential damages associated with high temperature. If the situation which caused the rise in temperature is reversed, the temperature of the electrochemical cell or cells 20 will decrease and the layer of PTC material 70 will return to its electrically conductive state when the temperature falls below the transition temperature of the PTC material thereby closing the electrical circuit.

Figure 12:
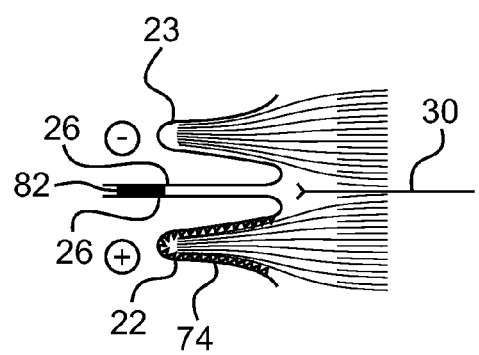
FIG. 12 is a schematic front elevational view of a portion of two electrochemical cells shown in FIG. 1 connected together via current collecting terminals in accordance with another embodiment of the invention.

With reference to FIGS. 11 and 12, the extensions of the lithium metal foils of all the negative electrodes may also be assembled first and thereafter the current collecting terminal 23 including the layer of PTC material 70 is crimped onto the previously assembled extensions of the lithium metal foils of the negative electrodes.

FIG. 12 illustrates another example of implementation of a PTC material positioned at the connection level between two electrochemical cells 20. In this example, a layer of PTC material 74 is positioned inside the crimping portion of the current collecting terminal 22. The extensions of the current collectors of all the positive electrodes of the electrochemical cell 20 are assembled and welded together and thereafter the current collecting terminal 22 is crimped onto the previously welded extensions of the current collectors of the positive electrodes with the layer of PTC material 74 directly in contact with the extensions of the current collectors of the positive electrodes. The layer of PTC material 74 is therefore interposed between the extensions of the current collectors of the positive electrodes and the current collecting terminal 22 such that the layer of PTC material 74 is an integral part of the electrical connection between current collecting terminals 22 and 23 and electrical current is prevented from flowing if the layer of PTC material 74 reaches its transition temperature. As illustrated, current collecting terminals 22 and 23 are connected together via their respective folded extension arms 26 by welding at the connection area 82. If a short-circuit, or an overcharge condition, or an over discharge condition occurs, causing a rapid rise in the temperature of the electrochemical cell or cells 20, the layer of PTC material 74 will eventually reach its transition temperature where the resistance of the layer of PTC material increases sharply to become effectively non-conductive thereby opening the electrical circuit and preventing further rise in the temperature and the potential damages associated with high temperature.

If the situation which caused the rise in temperature is reversed, the temperature of the electrochemical cell or cells 20 will decrease and the layer of PTC material 74 will return to its electrically conductive state when the temperature falls below the transition temperature of the PTC material thereby closing the electrical circuit.

Obviously, combinations of two or more of the previously described examples are possible. As well, the previously described examples are specific to a prismatic assembly of laminates to form an electrochemical cell 20 however; current collecting terminals 22 and 23 may by use to connect flat rolled laminate assemblies forming flat electrochemical cells.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A battery comprising a plurality of electrochemical cells connected in series or parallel; each electrochemical cell having a length and comprises a series of primary laminates each including a negative electrode, a positive electrode, an electrolyte interposed between the negative and positive electrodes, a positive current collector extending from one side of the primary laminates and a negative current collector extending from an opposite side of the primary laminates; each electrochemical cell having a positive current collecting terminal connecting the positive current collectors together and a negative current collecting terminal connecting the negative current collectors together; the positive and negative current collecting terminals extending the entire length of the electrochemical cell, each positive and negative current collecting terminals having a folded extension arm for electrically connecting two adjacent electrochemical cells together either in series or parallel, a layer of PTC material being spread directly onto surfaces of the folded extension arm of adjacent positive and/or negative current collecting terminals over the entire length of the folded extension arm and being an integral part of an electrical connection between two adjacent electrochemical cells for opening and closing the electrical connection between the two adjacent electrochemical cells at a predetermined temperature.

2. A battery as defined in claim 1, wherein the layer of PTC material is a polymer carbon composite.

3. A battery as defined in claim 1, wherein the layer of PTC material is a barium titanate based compound.

4. A battery as defined in claim 1, wherein the predetermined temperature is 125° C.

* * * * *